Sept. 26, 1967     J. E. BORAH     3,343,218

MOLD MOUNTING STRUCTURE FOR PRESS

Filed July 15, 1965     4 Sheets-Sheet 1

INVENTOR.
JOHN E. BORAH
BY *M. A. Hobbs*
ATTORNEY

United States Patent Office 3,343,218
Patented Sept. 26, 1967

3,343,218
MOLD MOUNTING STRUCTURE FOR PRESS
John E. Borah, 815 Mishawaka Ave.,
Mishawaka, Ind. 46544
Filed July 15, 1965, Ser. No. 472,231
7 Claims. (Cl. 18—16)

The present invention relates to a mold mounting structure for mounting a multiple section mold in a press for molding rubber and similar products.

In the rubber industry the conventional method of molding rubber products generally involves the use of multiple section molds which are loaded with the molding material, assembled and placed in the press, and after the molding material has cured, are removed from the press and pried open manually with the use of suitable tools. Since the molds are moved into and from the press manually and the sections of the mold separated from one another by manually operable means, the molds are necessarily of relatively small size and limited capacity. In recent years a power operated mold handling apparatus has been developed which performs all of the manual operations, including separating the mold sections from one another, removing the section or sections containing the molded articles from the press, removing the molded articles from the mold cavities, and reloading the mold for the next succeeding molding operation. Since, in this new type of mold handling apparatus and method, none of the foregoing operations are performed manually, the size of the molds and number of cavities have been increased to take advantage of the inherent capabilities of the new apparatus, resulting in a greatly improved and more efficient molding operation. However, with the increased size and capacity of the molds which are made of steel, the weight of the molds and often the individual sections have become too large to permit the molds to be effectively and conveniently mounted in the press by manual means, and, in the past, by power means such as lift trucks or hoists, which have not been capable of maneuvering effectively around and sufficiently close to the press to mount the mold in place either as assembled molds or as disassembled mold sections. In plant operations requiring frequent changing of the molds for different products, substantial down time of the press and loss in time of skilled press operators have resulted. Further, in view of the size and weight of the mold sections, those sections which remained in the press during the complete molding operation, have been bolted in place or supported by parts which have required a number of operations in order to mount and remove the sections from the press and mold operating apparatus. It is therefore one of the principal objects of the present invention to provide a structure for mounting the mold sections of the foregoing automatic mold operating apparatus which permits the mold sections to be inserted in the mold operating apparatus in assembled condition and as a unit, and which can be secured in operating position with a minimum number of steps or operations.

Another object of the invention is to provide a relatively simple, easily operated mold mounting apparatus into which the mold sections can be readily slipped from the front of the press without operating or manipulating the press or parts thereof during the installation operation, and which permits the molds to be easily removed from the press by power handling mechanisms while the molds are still hot from the mold operations.

Still another object is to provide a mold mounting structure which can easily be incorporated into the aforementioned automatic mold handling apparatus without making any substantial changes in the construction of the apparatus, and which is compact and contains few moving parts separate from the mold handling apparatus.

Additional objects and advantages of the invention will become apparent from the following description and accompanying drawings, wherein.

Figure 1:
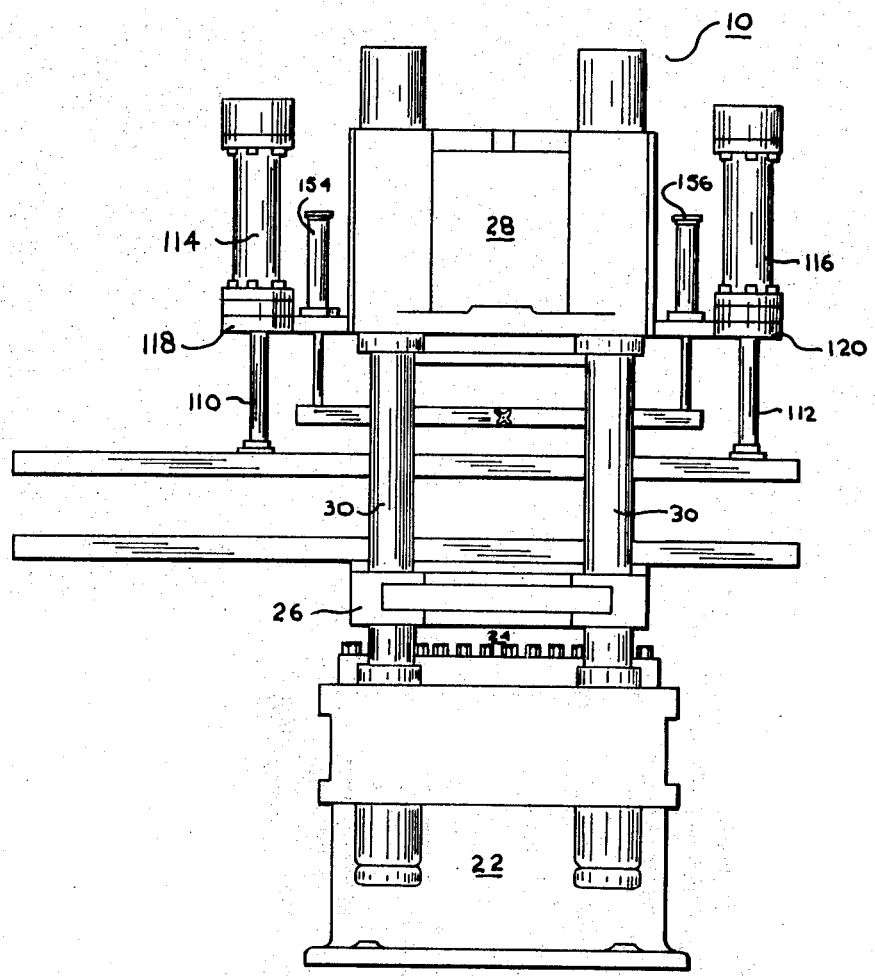
FIGURE 1 is a side elevational view of the press for molding rubber articles, on which an automatic apparatus has been installed containing the present mold mounting structure therein, the press being shown in open position.
Figure 2:
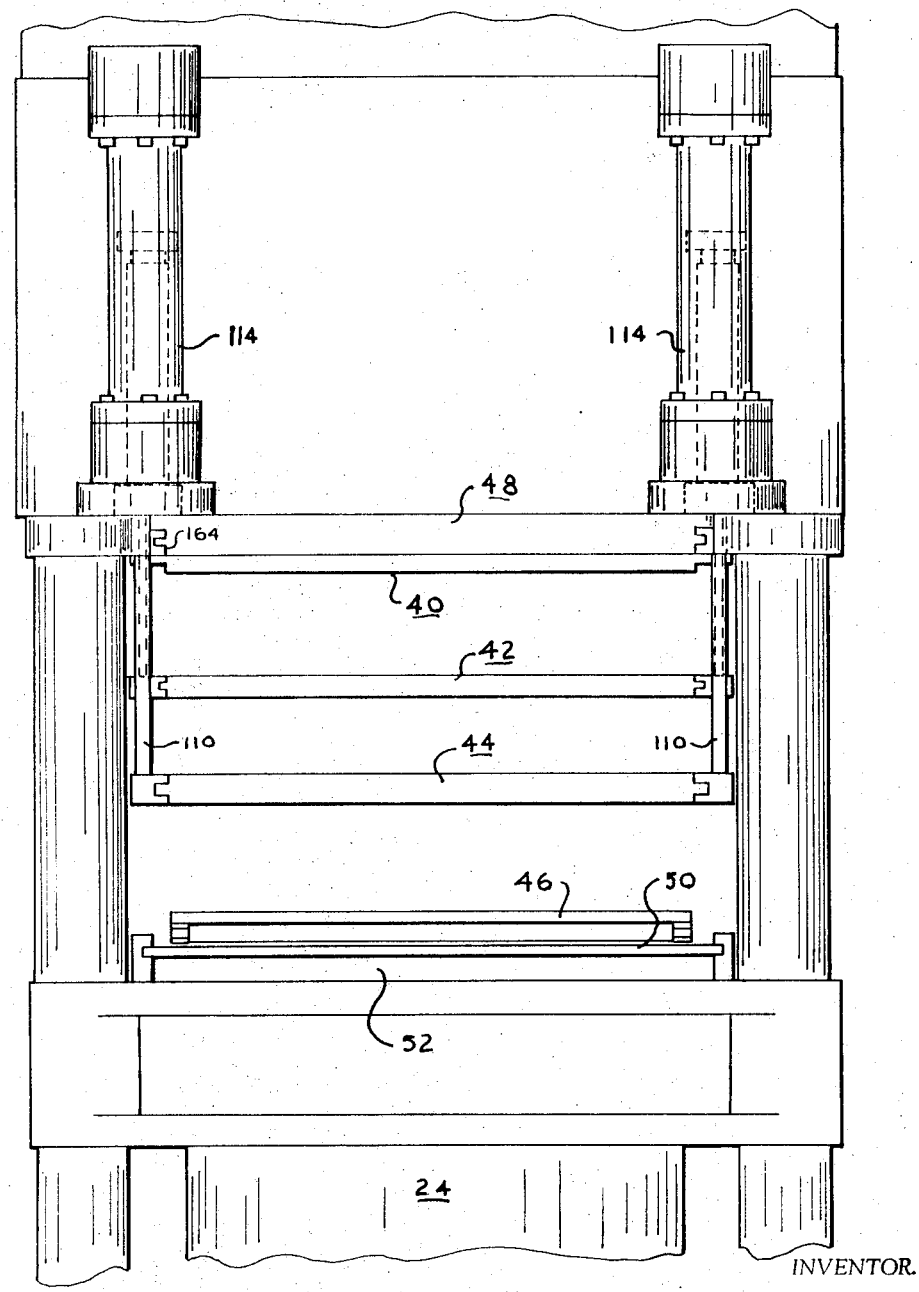
FIGURE 2 is an enlarged front elevational view of the press shown in FIGURE 1 with the automatic mold handling apparatus and mold mounting structure contained therein.
Figure 3:
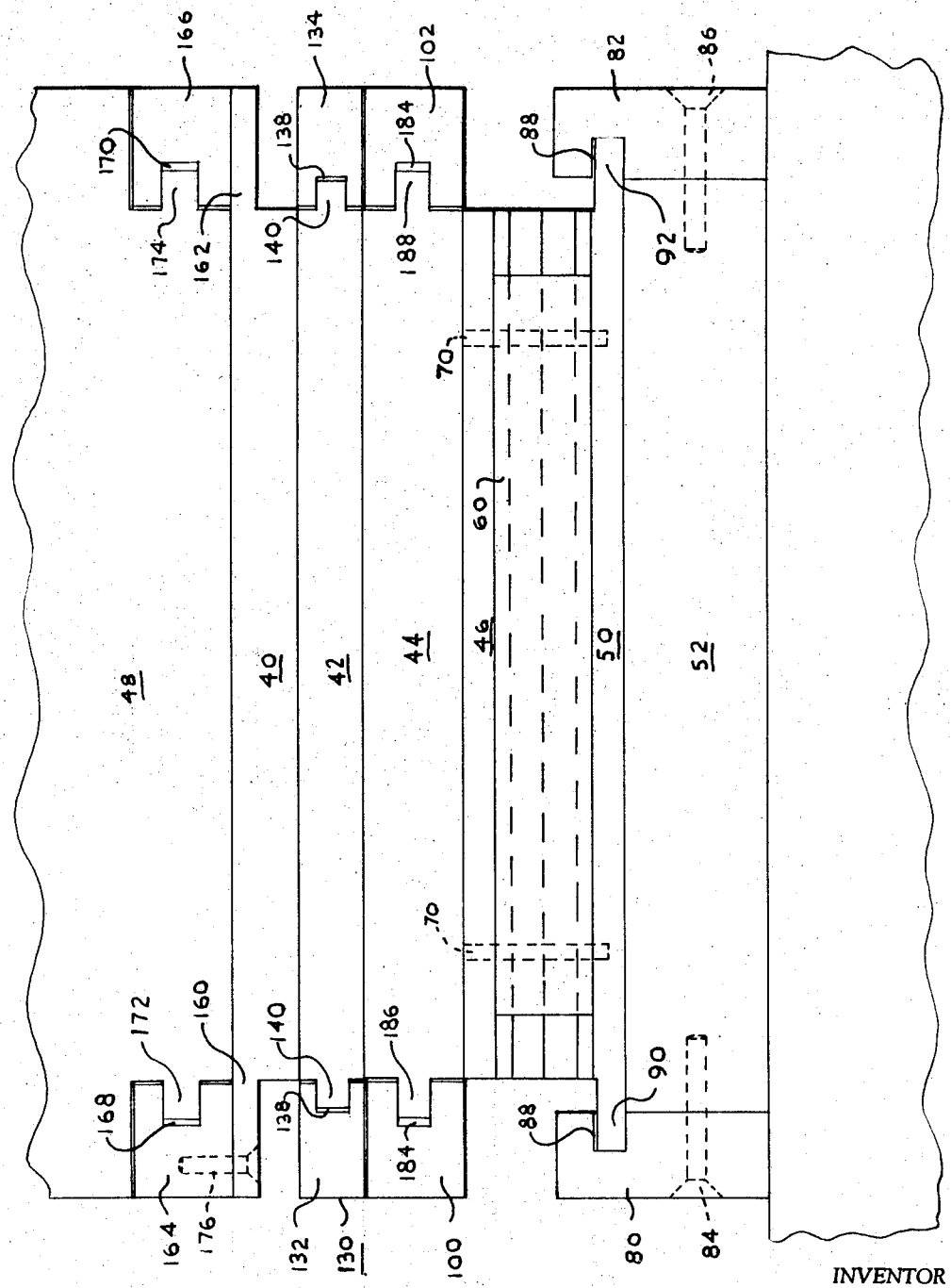
FIGURE 3 is an enlarged fragmentary front elevational view of the press and the mold mounting structure, showing the mold in closed position.
Figure 4:
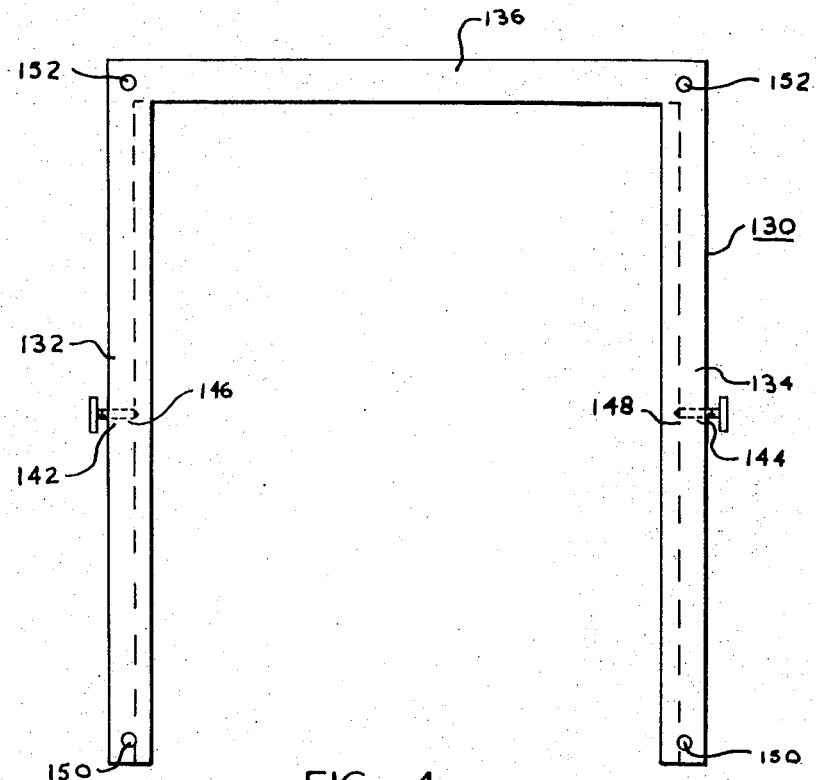
FIGURE 4 is a top plan view of a frame for removably supporting one of the intermediate sections of the molds.
Figure 5:
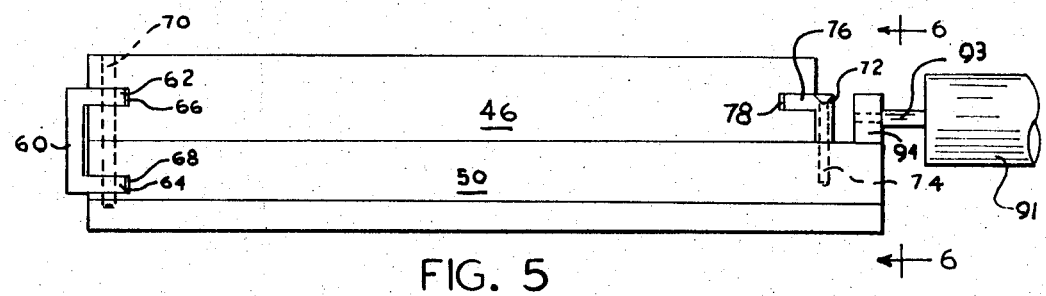
FIGURE 5 is a side elevational view of the bottom mold section and adapters, showing the manner in which the two are secured together when the mold is in operating position in the press.
Figure 6:
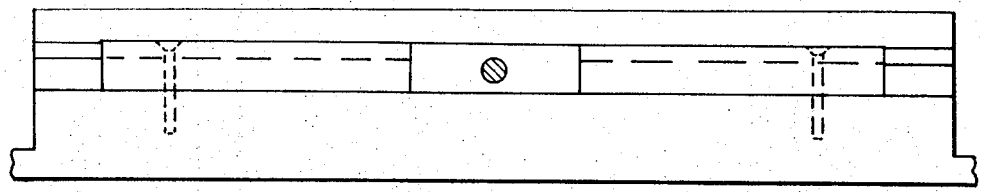
FIGURE 6 is a rear elevational and partial cross sectional view of the lower mold section and adapter shown in FIGURE 5, the section being taken on line 6—6 of FIGURE 5.

Referring more specifically to the drawings and to FIGURES 1 and 2 in particular, numeral 10 designates generally a hydraulic press including a base 22 containing a hydraulic cylinder with a ram 24, plunger 26, press head 28, and posts 30 at the four corners of the press, tying the base 22 and head 28 together in a rigid structure. The plunger 26 is secured to the upper end of ram 24 and is provided with bosses journalled in the tie rods. The press shown in the drawings is considered, for the purpose of the present description, as a conventional hydraulic press controlled and operated by well known hydraulic equipment, including a supply tank, electric driven pressure pump, and standard control valves and relays (not shown). This type of press is extensively used in the rubber industry and the details in construction shown are included to fully illustrate the construction and operation of the present mold mounting structure incorporated in the press and mold handling apparatus more fully disclosed and claimed in U.S. Patent No. 2,983,953.

A transfer mold for producing rubber articles illustrates one type of mold adapted for the present mold mounting structure, and is operated by the mold handling apparatus installed in the press. The mold consists of a plunger plate 40, potwell plate 42, center plate 44, and bottom plate 46, the plunger plate 40 and bottom plate 46 frequently being referred to as upper and lower mold sections and potwell plate 42 and center plate 44 frequently being referred to as the intermediate mold sections. The upper mold section is in direct contact with the upper platen 48 and receives heat therefrom and transmits the heat to section 44 for curing the moldable material in section 44, and the lower mold section 46 is secured to adapter 50 which in turn is mounted in direct contact with lower platen 52 which is heated and which transfers the heat through the adapter to the lower and intermediate mold sections 46 and 44, respectively. The upper and lower platens are heated electrically or by steam, and are secured to the head and ram, respectively, and remain permanently in the press, i.e., are not disturbed when the molds are moved from and inserted in the press. The cavities of the molds may be of a variety of different shapes, depending upon the type of product being produced, but mold sections 40, 42, 44 and 46 usually remain substantially as illustrated regardless of the shape of the product being molded.

The lower mold section 46 is mounted on the upper surface of adapter 50 and secured thereto by fixture 60 of U-shaped cross section having upper and lower members 62 and 64 seating in longitudinal grooves 66 and 68 in the front face of the mold section and adapter. The fixture is held securely in place in the grooves by a plurality of pins 70 extending downwardly through the mold section and seating in the adapter. The rear portion of the mold is secured to the adapter by an inverted angular fixture 72, secured to the adapter by a plurality of bolts 74 and having a horizontally projecting member 76 seating in a longitudinal groove 78 in the rear face of the mold section. When the mold is assembled in this manner, it is rigidly held in place on the upper surface of the adapter and will not be accidentally displaced therefrom when the mold is being operated by the mold handling apparatus shown in the drawings.

The lower mold section is movably seated on the upper surface of platen 52 and is held thereon by tracks 80 and 82 secured to the platen by a plurality of bolts 84 and 86, respectively. Each track contains an inwardly facing longitudinal groove 88 for receiving outwardly extending flanges 90 and 92 on opposite sides of adapter 50. The bottoms of grooves 88 are on a plane with the upper surface of platen 52 so that the adapter can slide smoothly from the upper surface of the adapter along tracks 80 and 82 as the adapter is removed from the press along the tracks to a position in front of the press. The adapter 50 and lower mold section 46 are removed from and returned to the press along tracks 80 and 82 by hydraulic cylinders 91 connected by a piston rod 93 to a member 94 secured to the rear edge of the adapter.

Tracks 100 and 102 are supported for movement between the press closed and open position by rods 110 and 112 at the forward and rearward ends of each track, and these rods are operated in both the upward and downward directions by hydraulic cylinders 114 and 116 rigidly mounted on press extensions 118 and 120, respectively. The hydraulic cylinders, the details of which are not shown in the drawings since they are of standard construction, are preferably operated by the hydraulic system of the press through lines connected to the upper and lower ends of the cylinders. The cylinders contain pistons secured to the upper end of respective rods 110 and 112, FIGURE 1 showing tracks 100 and 102 suspended on the rods between the upper and lower platens of the press when the press is in open position. When the press is in this position the intermediate mold section 44 is held in spaced relation with respect to intermediate mold section 42 and lower mold section 46.

Intermediate mold section 42 is supported by a frame indicated generally by the numeral 130 consisting of two side track members 132 and 134 connected at the rear end by a cross member 136. The inner edges of the side members 132 and 134 have inwardly facing grooves 138 for receiving tongue 140 on opposite edges of the intermediate section 42, which slides longitudinally in members 132 and 134. The whole section 42 is positioned and held in alignment with the other mold sections by screws 142 and 144 of track members 132 and 134, respectively, the two screws seating in slots 146 and 148 in the opposite edges of the mold section. The frame is suspended on rods 150 and 152 at the forward and rear ends, respectively, of track members 132 and 134. The rods are connected to pistons in hydraulic cylinders 154 and 156 at the forward and rear ends of the track members, the hydraulic cylinders being supported on brackets 118 and 120, respectively. The hydraulic cylinders move frame 130 and intermediate mold section 42 upwardly and downwardly as the press opens and closes, and hold the frame and mold section in spaced relation to plunger 40 and intermediate mold section 44 when the press is open. The mold section 42 can be easily removed from the frame by merely loosening screws 142 and 144 and slipping the mold section forwardly along track members 132 and 134 toward the front end of the press. The hydraulic cylinders 154 and 156 are operated preferably by the hydraulic system of the press, and function not only to separate the intermediate mold section 42 from plunger 40, but also to equalize the pressure on mold section 42 so that it will not bind or cock in the opening operation. If the hydraulic cylinders are not used, the plunger and mold section normally would separate by gravity, either alone or with the assistance of a spring operated mechanism as a substitution used in place of the hydraulic cylinders. However, the hydraulic cylinders provide a more dependable and uniform operation.

The plunger 40 is removably mounted in the press by the lateral marginal edges 160 and 162 secured to tracks 164 and 166, respectively, the inner edges of which contain grooves 168 and 170 for receiving tongues 172 and 174 joined integrally to upper platen 48. The plunger is secured to the tracks by any suitable means such as screws 176. As tracks 164 and 166 slide longitudinally along tongues 172 and 174 when the mold is being removed from the press, plunger 40 is carried from the operating position in the mold to the position in front of the press.

The lower intermediate mold section 44 is supported by the laterally spaced tracks 100 and 102 on opposite sides of the mold section, and the track is provided with inwardly facing longitudinal grooves 184 for receiving flanges 186 and 188 on opposite sides of mold section 44. The two flanges slide along the grooves as the mold section is moved to and from the press along tracks 100 and 102.

In the operation of the present apparatus, starting with the press open and with the mold in the fully installed position shown in the drawings, and after the press is warm, the moldable material is placed in intermediate section 42, i.e., the potwell 42, and the mold is fully closed. After the material has been cured in the mold, the press is opened, causing the four sections of the mold to separate in the manner illustrated in FIGURE 2. In the embodiment shown, the molded articles are in intermediate section 44. This intermediate section is then moved from a position in the press along tracks 100 and 102 to a position beyond the press where the molded articles are removed from the cavities. This mold section is then returned to the press and moldable material is again placed in the intermediate section 42, i.e., in the potwell, preparatory for the next operation.

When the mold is to be changed, the mold is moved by the press to closed position without maintaining pressure on the mold, and since the pins in the various sections lock the mold sections together, the sections are held in alignment. The sections of the mold are disengaged from the press by loosening screws 142 and 144, thus permitting the mold to slide forwardly along the tracks 80 and 82, 100 and 102, 132 and 134, 164 and 166 until the mold is suspended by the tracks beyond the press. A lift truck or other lifting means can effectively engage the mold in its closed position and remove it completely from the press for the purpose of storing the molds, even though the molds may still be hot from the molding operation. The molds can be readily inserted in the press by using the lift truck to insert the closed mold in the tracks while the tracks are in a substantially closed position, and thereafter by pushing the mold into the press where it is clamped by screws 142 and 144.

The mold mounting structure can readily be adapted to various size molds, and molds of different numbers of sections can be used in place of the four section mold illustrated. While only one embodiment of the present invention has been described in detail herein, various changes and modifications may be made to satisfy requirements.

I claim:
1. A mold mounting structure for use with a press having a ram with a platen and a head with a platen in combination with a mold having upper, lower and two intermediate mold sections: a lower adapter plate on said ram platen, an upper adapter plate adjacent the lower side of said head platen, a pair of tracks connected to said ram platen and extending from the press for supporting and guiding said ram platen adapter plate, a pair of tracks above said first mentioned tracks extending from the press for supporting and guiding said lower intermediate section, a pair of vertically positioned rods spaced along said second mentioned tracks in spaced relation to said first tracks when the press is open, hydraulic cylinders connected to said rods for raising and lowering said second mentioned tracks, a frame having two track members above said second mentioned tracks for supporting said upper intermediate mold section in sliding relation thereto, vertically positioned rods connected to said frame for holding it in spaced relation to said second mentioned tracks, hydraulic cylinders connected to said rods for raising and lowering said frame, a track means interconnecting said upper adapter plate with said head platen for slidably supporting said upper adapter, means securing the upper mold section to said upper adapter plate, means releasably securing said lower mold section to said lower adapter plate for movement therewith, a plurality of pins interconnecting said mold sections only when the mold is in closed or nearly closed position, and a hydraulic cylinder connected to said lower adapter plate for moving said mold into and from the press.

2. A mold mounting structure for use with a press having a ram with a platen and a head with a platen in combination with a mold having upper, lower and two intermediate mold sections: a lower adapter plate on said ram platen, an upper adapter plate adjacent the lower side of said head platen, a pair of tracks connected to said ram platen and extending from the press for supporting and guiding said ram platen adapter plate, a pair of tracks above said first mentioned tracks extending from the press for supporting and guiding said lower intermediate section, a pair of vertically positioned rods spaced along said second mentioned tracks for supporting said tracks in spaced relation to said first tracks when the press is open, hydraulic cylinders connected to said rods for raising and lowering said second mentioned tracks, a frame having two track members above said second mentioned tracks for supporting said upper intermediate mold section in sliding relation thereto, vertically positioned rods connected to said frame for holding it in spaced relation to said second mentioned tracks, hydraulic cylinders connected to said rods for raising and lowering said frame, a track means interconnecting said upper adapter plate with said head platen for slidably supporting said upper adapter, means securing the upper mold section to said upper adapter plate, and means releasably securing said lower mold section to said lower adapter plate for movement therewith whereby said mold may be inserted into and removed from the press as a unit along said tracks and track members.

3. A mold mounting structure for use with a press having a ram with a platen and a head with a platen in combination with a mold having upper, lower and two intermediate mold sections: a pair of tracks connected to said ram platen and extending from the press for supporting and guiding said lower mold section, a pair of tracks above said first mentioned tracks extending from the press for supporting and guiding said lower intermediate section, a pair of vertically positioned rods spaced along said second mentioned tracks for supporting said second mentioned tracks in spaced relation to said first tracks when the press is open, hydraulic cylinders connected to said rods for raising and lowering said second mentioned tracks, a frame having two track members above said second mentioned tracks for supporting said upper intermediate mold section in sliding relation thereto, vertically positioned rods connected to said frame for holding it in spaced relation to said second mentioned tracks, a track means interconnecting said upper adapter plate with said upper mold section, a plurality of pins interconnecting said mold sections only when the mold is in closed or nearly closed position, and a power means connected to said lower mold section for moving said mold into and from the press.

4. A mold mounting structure for use with a press having a ram with a platen and a head with a platen in combination with a mold having upper, lower and two intermediate mold sections: a pair of tracks connected to said ram platen and extending from the press for supporting and guiding said lower mold section, a pair of tracks above said first mentioned tracks extending from the press for supporting and guiding said lower intermediate section, a pair of vertically positioned rods spaced along said second mentioned tracks for supporting said second mentioned tracks in spaced relation to said first tracks when the press is open, fluid cylinders connected to said rods for raising and lowering said second mentioned tracks, a frame having two track members above said second mentioned tracks for supporting said upper intermediate mold section in sliding relation thereto, vertically positioned rods connected to said frame for supporting said frame, and track means interconnecting said upper adapter plate with said upper mold section whereby said mold may be inserted into and removed from the press as a unit along said tracks and track members.

5. A mold mounting structure for use with a press having a ram with a platen and a head with a platen in combination with a mold having upper, lower and an intermediate mold section: a pair of tracks connected to said ram platen and extending from the press for supporting and guiding said lower mold section, a pair of tracks above said first mentioned tracks extending from the press for supporting and guiding said intermediate section, a pair of vertically positioned rods spaced along said second mentioned tracks for supporting said second mentioned tracks in spaced relation to said first tracks when the press is open, power means connected to said rods for raising and lowering said second mentioned tracks, a track means interconnecting said upper adapter plate with said upper mold section, a plurality of pins interconnecting said mold sections only when the mold is in closed or nearly closed position, and a power means connected to said lower adapter plate for moving said mold into and from the press.

6. A mold mounting structure for use with a press having a ram with a platen and a head with a platen in combination with a mold having upper and lower and an intermediate mold section: a pair of tracks connected to said ram platen and extending from the press for supporting and guiding said lower mold section, a pair of tracks above said first mentioned tracks extending from the press for supporting and guiding said intermediate section, a pair of vertically positioned rods spaced along said second mentioned tracks for supporting said second mentioned tracks in spaced relation to said first tracks when the press is open, and a track means interconnecting said upper adapter plate with said upper mold section whereby said mold may be inserted into and removed from the press as a unit along said tracks and track members.

7. A mold mounting structure for use with a press having a ram with a platen and a head with a platen in combination with a mold having upper, lower and two intermediate mold sections: a pair of tracks connected to said ram platen and extending from the press for supporting and guiding said lower mold section, a pair of tracks above said first mentioned tracks extending from the press for supporting and guiding said lower intermediate section, a pair of vertically positioned rods spaced along said second mentioned tracks for supporting said second mentioned tracks in spaced relation to said first tracks when the press is open, a frame having two track members above said second mentioned tracks for supporting said upper intermediate mold section in sliding relation thereto, vertically positioned rods connected to said frame and holding it in spaced relation to said second mentioned tracks, and a track means interconnecting said upper adapter plate with said upper mold section, whereby said mold may be inserted into and removed from the press as a unit along said tracks and track members.

References Cited

UNITED STATES PATENTS

| | | | |
|---|---|---|---|
| 2,983,953 | 5/1961 | Borah | 18—2 X |
| 3,242,532 | 3/1966 | Borah | 18—16 |
| 3,266,094 | 8/1966 | Borah | 18—16 |

J. HOWARD FLINT, JR., *Examiner.*

J. SPENCER OVERHOLSER, *Primary Examiner.*